United States Patent
Loui et al.

(10) Patent No.: US 10,706,549 B2
(45) Date of Patent: Jul. 7, 2020

(54) ITERATIVE METHOD FOR SALIENT FOREGROUND DETECTION AND MULTI-OBJECT SEGMENTATION

(71) Applicant: KODAK ALARIS, INC., Rochester, NY (US)

(72) Inventors: Alexander Loui, Penfield, NY (US); David Kloosterman, Penfield, NY (US); Michal Kucer, Rochester, NY (US); Nathan Cahill, Rochester, NY (US); David Messinger, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 251 days.

(21) Appl. No.: 15/847,050

(22) Filed: Dec. 19, 2017

(65) Prior Publication Data

US 2018/0174301 A1     Jun. 21, 2018

Related U.S. Application Data

(60) Provisional application No. 62/436,803, filed on Dec. 20, 2016.

(51) Int. Cl.
*G06T 7/11*     (2017.01)
*G06T 7/194*    (2017.01)
(Continued)

(52) U.S. Cl.
CPC ............. *G06T 7/11* (2017.01); *G06K 9/4671* (2013.01); *G06T 7/12* (2017.01); *G06T 7/136* (2017.01);
(Continued)

(58) Field of Classification Search
None
See application file for complete search history.

(56) References Cited

U.S. PATENT DOCUMENTS

| 7,835,820 B2 * | 11/2010 | Peters, II | G05D 1/0221 700/245 |
| 8,060,272 B2 * | 11/2011 | Peters, II | G05D 1/0221 701/28 |

(Continued)

OTHER PUBLICATIONS

Kucer et al., "Augmenting Salient Foreground Detection using Feidler Vector for Multi-Object Segmentation," IS&T International Symposium on Electronic Imaging 2017, vol. 2017, No. 17, Jan. 29, 2017, pp. 116-121.

(Continued)

*Primary Examiner* — Anand P Bhatnagar
(74) *Attorney, Agent, or Firm* — Hogan Lovels US LLP

(57) ABSTRACT

A system and method that performs iterative foreground detection and multi-object segmentation in an image is disclosed herein. A new background prior is introduced to improve the foreground segmentation results. Three complimentary methods detect and segment foregrounds containing multiple objects. The first method performs an iterative segmentation of the image to pull out the salient objects in the image. In a second method, a higher dimensional embedding of the image graph is used to estimate the saliency score and extract multiple salient objects. A third method uses a metric to automatically pick the number of eigenvectors to consider in an alternative method to iteratively compute the image saliency map. Experimental results show that these methods succeed in accurately extracting multiple foreground objects from an image.

6 Claims, 14 Drawing Sheets
(11 of 14 Drawing Sheet(s) Filed in Color)

(51) Int. Cl.
*G06K 9/46* (2006.01)
*G06T 7/136* (2017.01)
*G06T 7/162* (2017.01)
*G06T 7/12* (2017.01)

(52) U.S. Cl.
CPC .............. *G06T 7/162* (2017.01); *G06T 7/194* (2017.01); *G06T 2207/10004* (2013.01); *G06T 2207/20072* (2013.01)

(56) References Cited

U.S. PATENT DOCUMENTS

| | | | | |
|---|---|---|---|---|
| 8,401,292 | B2* | 3/2013 | Park | G06K 9/4671 382/173 |
| 9,595,114 | B2* | 3/2017 | Tunali | G06T 7/11 |
| 10,192,117 | B2* | 1/2019 | Loui | G06K 9/00765 |
| 10,198,629 | B2* | 2/2019 | Segalovitz | G06K 9/4676 |
| 2009/0254236 | A1* | 10/2009 | Peters, II | G05D 1/0221 701/28 |
| 2010/0226564 | A1* | 9/2010 | Marchesotti | G06K 9/4671 382/159 |
| 2011/0082871 | A1* | 4/2011 | Peters, II | G05D 1/0221 707/756 |
| 2011/0295515 | A1* | 12/2011 | Grady | A61B 5/4064 702/19 |
| 2012/0275701 | A1* | 11/2012 | Park | G06K 9/4671 382/173 |
| 2015/0117783 | A1 | 4/2015 | Lin et al. | |
| 2016/0239981 | A1* | 8/2016 | Tunali | G06T 7/11 |
| 2016/0379055 | A1* | 12/2016 | Loui | G06K 9/00765 382/103 |
| 2017/0337711 | A1* | 11/2017 | Ratner | H04N 19/176 |
| 2018/0295375 | A1* | 10/2018 | Ratner | H04N 19/436 |
| 2019/0139282 | A1* | 5/2019 | Rathore | G06K 9/4642 |

OTHER PUBLICATIONS

Perazzi et al., "Efficient Salient Foreground Detection for Images and Video using Fiedler Vectors," Eurographics Workshop on Intelligent Cinematography and Editing, May 5, 2015.

Invitation to Pay Additional Fees, and Communication Relating to the Results of the Partial International Search dated Apr. 30, 2018 in PCT/US2017/067309.

* cited by examiner

US 10,706,549 B2

ITERATIVE METHOD FOR SALIENT FOREGROUND DETECTION AND MULTI-OBJECT SEGMENTATION

BACKGROUND OF THE INVENTION

With continuous miniaturization of silicon technology and proliferation of consumer and cell-phone cameras, there has been an exponential increase in the number of images that are captured. Whether the images are stored on personal computers or reside on social networks (e.g. Instagram, Flickr), the sheer number of images calls for methods to determine various image properties, such as object presence or appeal for the purpose of automatic image management. One of the central problems in consumer photography centers on determining the aesthetic appeal of the image. The problem itself is challenging, because the overall aesthetic value of an image is dependent on its technical quality, composition, emotional value, and the like. In order to combine all of these aspects, sophisticated systems must be built to take into account all of the aspects of image aesthetics. One such aspect is the prediction of the presence and possible segmentation of a salient object in the image, which could inform the system about the features that the system should consider in determining the aesthetics appeal.

An efficient method for the computation of salient foreground in consumer quality images has recently been proposed in F. Perazzi, O. Sorkine-Hornung, A. Sorkine-Hornung, "Efficient Salient Foreground Detection for Images and Video using Fiedler Vectors," *Eurographics Workshop on Intelligent Cinematography and Editing*, Zurich, Switzerland, May 5, 2015. However, this method is not able to deal with an image that contains multiple objects in the scene effectively. Specifically, in the case of multiple disconnected objects, this method can only correctly detect a single salient object in the scene. What is desired is a system and method that can overcome this major deficiency of the prior art method.

SUMMARY OF THE INVENTION

According to the present invention, a system and method overcomes the deficiencies in prior art systems and methods by employing an iterative approach so that a wider array of images, including images with multiple subjects, can be analyzed for salient foreground objects.

The present invention is directed to a system and method for iterative foreground detection and multi-object segmentation. A new "background prior" is introduced to improve the foreground segmentation results. Furthermore, three complimentary embodiments are presented and demonstrated to detect and segment foregrounds containing multiple objects. The first embodiment performs an iterative segmentation of the image to "pull out" the various salient objects in the image. In the second embodiment, a higher dimensional embedding of the image graph is used to estimate the saliency score and extract multiple salient objects. In the third embodiment, a newly proposed metric is used to automatically pick the number of eigenvectors to consider in an alternative method to iteratively compute the image saliency map. Experimental results show that the proposed methods succeed in extracting multiple foreground objects from an image with a much better accuracy than previous methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and other aspects of the invention will be described in detail with reference to the accompanying drawings, wherein.

DETAILED DESCRIPTION

Figure 1:
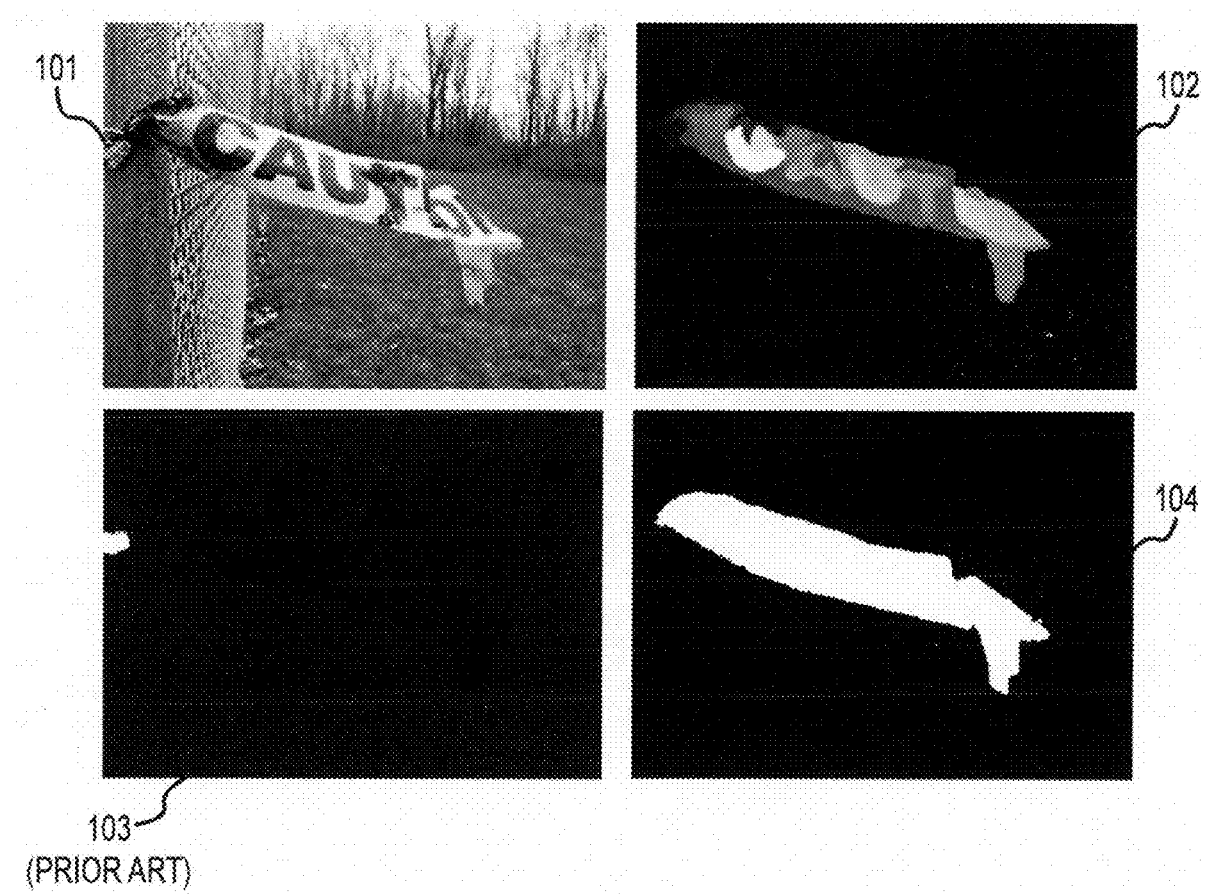
FIG. 1 shows a comparison of the saliency maps after an application of the method of the present invention, specifically showing an original image and corresponding saliency maps according to prior art methods and an improved saliency map according to the present invention.

The present invention is directed to a system and method for automatically detecting salient foreground objects and iteratively segmenting these objects in the scene of an image.

To efficiently represent the image, Perazzi et al. use a modified version of the SLIC (Simple Linear Iterative Clustering) Superpixel segmentation algorithm proposed in the paper "Saliency filters: Contrast based filtering for salient region detection," by F. Perazzi, P. Krahenbuhl, Y. Pritch, and A. Hornung, proceedings of the 2012 Computer Vision and Pattern Recognition conference, pages 733-740. In this case, the image is segmented into superpixels using K-means clustering in the Color-XY space (it uses CIELab color space instead of the traditional RGB space). After Superpixel segmentation, the image is represented as a Graph G={V, E} also known as the Image Region Adjacency Graph ("RAG"), where each vertex v∈V represents a superpixel from SLIC and is assigned a value of the mean Lab color of the superpixel. To model the local relationships in the image, the edge set E consists of the edges connecting vertices i and j, if their corresponding superpixels share a border in the segmented image. Each edge is assigned a weighed that is proportional to the Lab color difference between neighboring superpixels:

$$w_{i,j} = \frac{1}{\|c_i - c_j\|^2 + \varepsilon} \quad (1)$$

where $c_i$ is a mean Lab color of the $i^{th}$ superpixel and e is a small constant to ensure the numerical stability of the algorithm (e.g., e=$10^{-4}$). In order to represent the assumption that most of the border pixels belong to the background, the graph G can be augmented with a background node b, which is assigned the mean color of the boundary, and a set of edges that connects the background node and the superpixels on the edge of the image with weights computed by equation (1).

In order to assign a saliency score to each of the superpixels of the image, Perazzi et al. compute the Eigen decomposition of the graph Laplacian matrix L of the Image RAG. Then the Fiedler vector, the second smallest eigenvector is used to compute the saliency scores. Given the Fiedler vector f, the saliency score S is computed as:

$$S = -\text{sign}(f_b) \cdot f \quad (2)$$

And S is then scaled to the range [0,1], where $f_b$ represents the entry of the Fiedler vector corresponding to the background node.

Because an embodiment of the present invention uses a high dimensional embedding/representation, saliency scores are computed in the following way:

$$S(i) = \|f_i - f_b\| \quad (3)$$

where S(i) is the $i^{th}$ component of the vector S and the saliency score for the $i^{th}$ superpixel and $f_i$ and $f_b$ are the embedding of the $i^{th}$ and background superpixels.

Embodiments of the present invention are directed to augmenting the "background prior," which will be described in more detail. There are images in which the background is often very cluttered, and thus computing the edge weights by considering the average background color will fail to capture the background prior effectively by computing very small weights, since the average background color will be sufficiently different from each of the border superpixels and thus resulting in an unsatisfying saliency map. To correct for such a pitfall, instead of assigning to the image background node the average border background color (average color of the border superpixels), a set of colors representing the background is assigned to the background node. A K-Means clustering of the border colors is performed, and then the K-Means cluster centers, $\{c_1^b, \ldots, c_k^b\}$, are used to represent the background prior in the node. To compute the edge weight between the background node and the border regions, the maximum of the weights are computed between region i and each of the k cluster center colors:

$$w_{i,b} = \max_{j \in \{1, \ldots, k\}} \frac{1}{\|c_i - c_j^b\|^2 + \varepsilon} \quad (4)$$

When augmenting a background prior with multiple "colors," the background prior is better enforced, as can be seen in FIG. 1. FIG. 1 shows a comparison of the saliency maps after such enforcement. Specifically, FIG. 1 shows the original image 101 and its saliency map ground truth 104, as well as the saliency map 102 produced according to the present invention, which is much better than the saliency map 103 produced by Perazzi et al.

Embodiments of the present invention are also directed to detecting multiple objects, which will be described in more detail. The foreground segmentation method according to embodiments of the present invention allows for detecting multiple salient subjects in the image by using the following schemes: (1) an iterative foreground segmentation scheme, and (2) two alternative multi-object foreground segmentation schemes, which use the eigenvector of the Image Region Adjacency Graph ("RAG") as an embedding for the nodes and analysis of the presence of additional objects. This embedding is then used to calculate an alternative saliency score. Both schemes use a metric to determine the ideal foreground segmentation. Next, the metric used for picking the best saliency map, and the Silhouette score, which is a main component of the metric, is described.

The Silhouette score is now described in further detail. In order to judge the quality of the foreground segmentation, the K-Means clustering to cluster the saliency score into two (Foreground/Background) clusters is used, and then a metric is computed known as the "Silhouette score", first introduced by Rousseeuw (P. Rousseeuw, "Silhouettes: A graphical aid to the interpretation and validation of cluster analysis," Journal of Computational and Applied Mathematics, 20:53-65, 1987). The Silhouette score is one of the possible metrics that is used in interpretation and validation of cluster analysis.

To compute the Silhouette score, the resulting clustering and the matrix of distances (or dissimilarities as used by Rousseeuw) between the different points (e.g., superpixels and the Saliency score assigned to them in our algorithm) is needed. For each point i the method of the present invention computes:

a(i): average distance to the points in the same cluster as i (label that cluster A)

D(i, C): average distance to the points in cluster C b(i)=$\min_{C \neq A}$ D(i, C): by choosing a minimum of D(i, C), we compute the distance to the next best cluster assignment for i.

The final Silhouette score for point i is computed as:

$$s(i) = \frac{b(i) - a(i)}{\max\{a(i), b(i)\}} \quad (5)$$

which is then combined into a final score $f_{sil}$ for the image by taking the average of s(i) for all of the superpixels.

The Stopping criterion/metric is now described. Both of the above multi-object segmentation schemes detailed in the next section relies on some sort of stopping criterion or metric, which would determine either the ideal number of iterations or eigenvectors to consider when computing the saliency map for images with multiple objects. In order to determine the ideal number of iterations or number of eigenvectors, a metric that combines the Silhouette score, $f_{sil}$, and mean image saliency of the image is used:

$$score_{image} = f_{sil} \cdot \frac{\sum_{x=1}^{m}\sum_{y=1}^{n} S(x, y)}{A(I)} \quad (6)$$

where S(x, y) is the image saliency score at location (x, y) and A(I) represents the area of the image, and the mean image saliency is the summation of the image saliency score at each location (x, y) divided by the area of the image A(I). Then, in order to pick the final saliency map, the map with the highest overall image saliency score defined in equation (6) is chosen.

Figure 2:
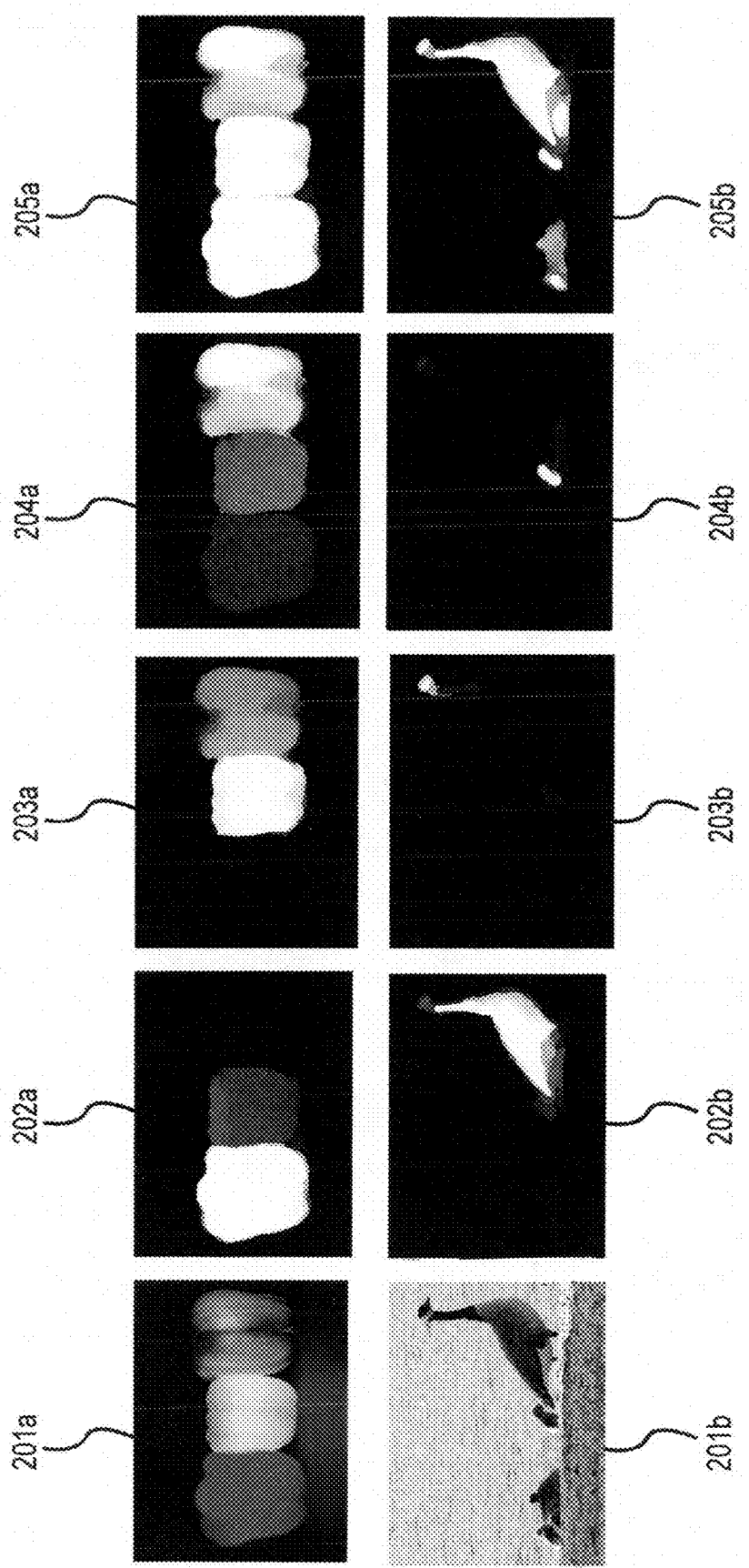
FIG. 2 shows an original image having a plurality of separate objects and a plurality of saliency maps with non-zero eigenvectors according to the present invention.
Figure 3:
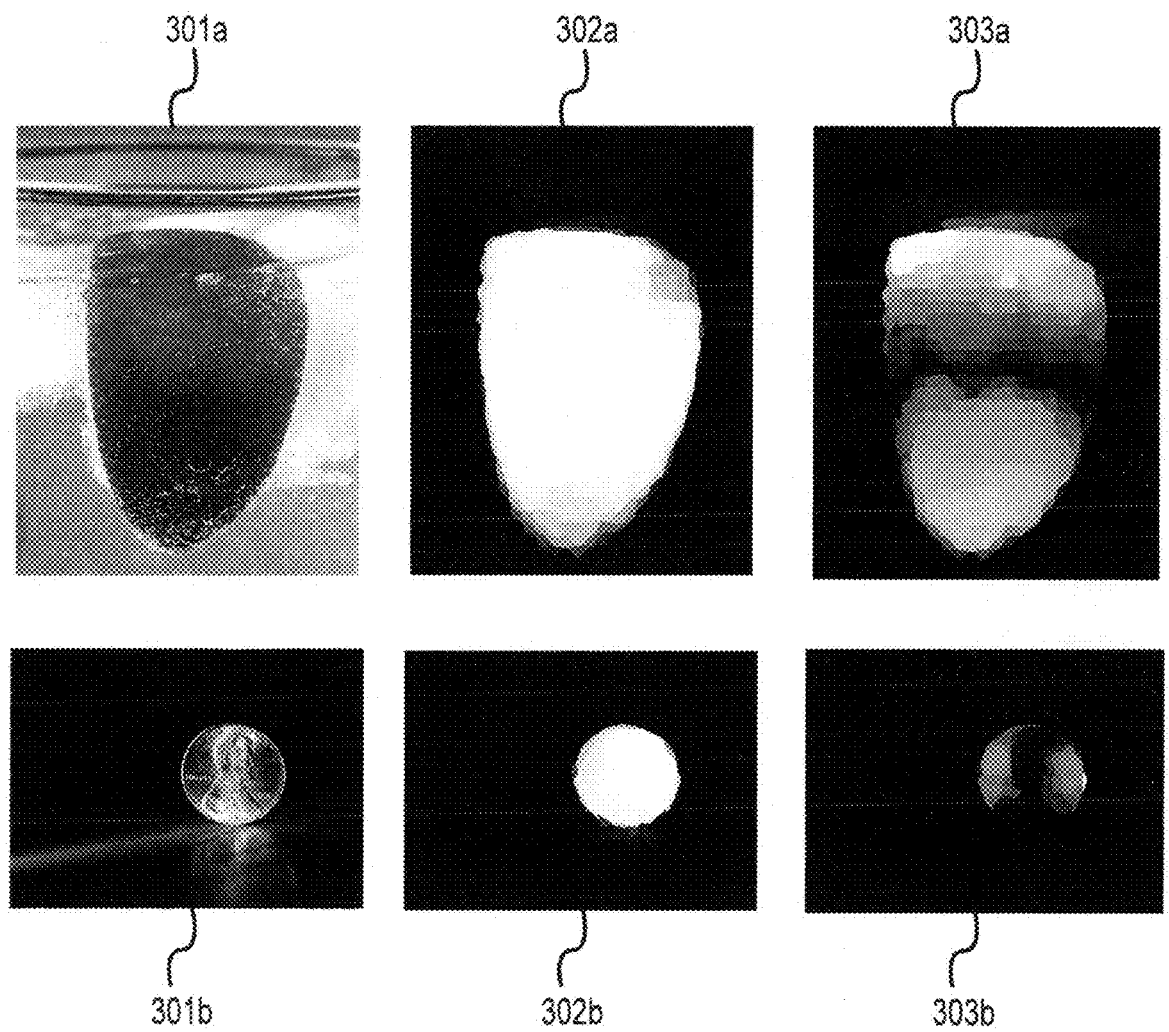
FIG. 3 shows an original image having a single object and a plurality of saliency maps with non-zero eigenvectors according to the present invention.

Presence of objects in eigenvectors is now described. It is important to note the presence of multiple salient objects embedded in higher dimensions of the RAG Laplacian matrix eigen decomposition. This can be seen in FIG. 2, where the plot of the image and its eigenvectors (we compute the saliency of an eigenvector by computing the scaled distance of each superpixel to the background node) is shown. For example, FIG. 2 shows a first original image 201a, including a plurality of objects, a saliency map 202a from a first non-zero eigenvector, a saliency map 203a from a second non-zero eigenvector, a saliency map 204a from a third non-zero eigenvector, and a final saliency map 205a. FIG. 2 also shows a second original image 201b, including a plurality of objects, a saliency map 202b from a first non-zero eigenvector, a saliency map 203b from a second non-zero eigenvector, a saliency map 204b from a third non-zero eigenvector, and a final saliency map 205b. However, the same cannot be said of many of the images that only contain a single salient object, as can be seen in FIG. 3. As can be seen, the fielder vector picks out the most salient object in the image and the subsequent eigenvector (at times several) contains redundant information regarding the object. Shown in FIG. 3 is a first original image including a single salient object 301a, a corresponding saliency map from a first non-zero eigenvector 302a, and a corresponding saliency map from a second non-zero eigenvector 303a. Also shown in FIG. 3 is a second original image including a single salient object 301b, a corresponding saliency map from a first non-zero eigenvector 302b, and a corresponding saliency map from a second non-zero eigenvector 303b.

The Stopping criterion based on the eigenvalue difference is now described. A different Stopping criterion is based on the percentage eigenvalue difference between subsequent dimensions. First the full Eigen decomposition of the augmented Region Adjacency Graph is computed. Then a subset of the first k non-zero eigenvalues is taken, and the percentage difference between the subsequent dimensions is computed:

$$\Delta_i = \frac{\lambda_{i+1} - \lambda_i}{\lambda_{i+1}} \quad (7)$$

where $\lambda_i$ is the $i^{th}$ eigenvalue.
Then, in order to get the ideal dimension n, the dimension that produces the largest difference is chosen:

$$n = \operatorname{argmax}_{1 \le i < k} \{\Delta_i\} \quad (8)$$

Multi-object segmentation schemes according to embodiments of the present invention are now described. A first iterative foreground segmentation scheme is described below:

Perform an initial foreground segmentation as described in Perazzi et al. with the improved background model introduced earlier, and compute the $score_{image}$ for this map.

Now, iteratively perform the following steps:
1. Find the set, £, of nodes or superpixels for which the saliency score $S_i$ is greater than a threshold $S_{th}$.
2. Modify the Image RAG by cutting out the nodes that belong to the set £ (store the saliency scores of these nodes for later processing).
3. Find new saliency scores for the region which remained in RAG by computing the Fiedler Vector of the new graph and computing and modifying it the same way described in Perazzi et al.
4. Combine the Saliency scores of the smaller region with the scores for the nodes from the set £, to obtain the new saliency image and compute its $score_{image}$.
5. Repeat for predetermined number of iterations.
6. Choose the segmentation map with highest $score_{image}$.

Figure 4:
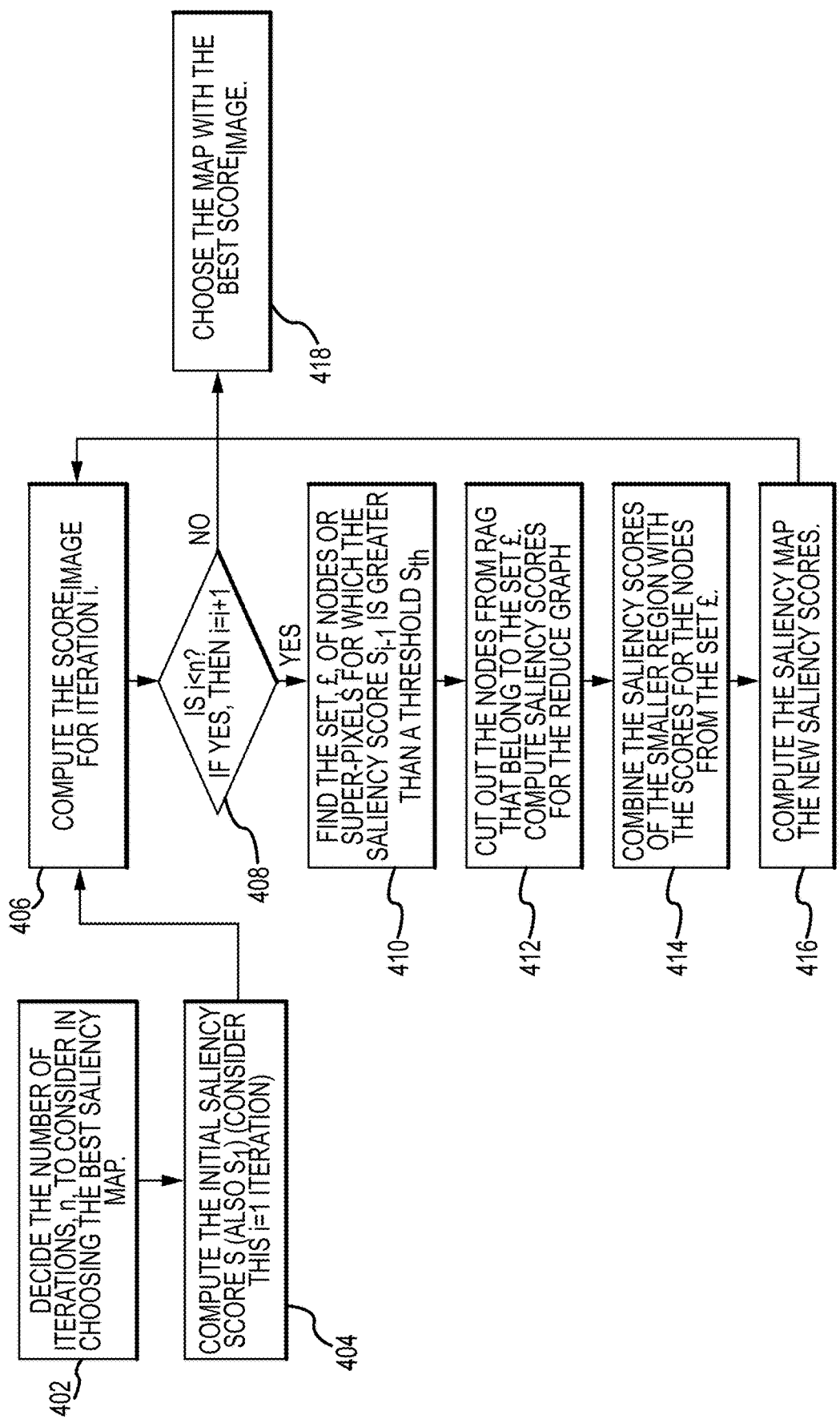
FIG. 4 shows a flowchart corresponding to a first embodiment of the invention.

FIG. 4 shows a flowchart that corresponds to the first scheme described above. At step 402, decide the number of iterations, n, to consider in choosing the best Saliency map. At step 404, compute the initial Saliency scores S (also $S_i$) as described previously (consider this i=1 iteration). At step 406, compute the $score_{image}$ for iteration i. At step 408, ask if i<n. If yes, then i=i+1. If no, then, at step 418, choose the map with the best $score_{image}$. At step 410, find the set, £, of nodes or superpixels for which the saliency score $S_{i-1}$ is greater than a threshold $S_{th}$. At step 412, cut out the nodes from the RAG that belongs to the set £. Compute saliency scores for the reduced graph as previously described. At step 414, combine the Saliency scores of the smaller region with the scores for the nodes from the set £. At step 416, compute the Saliency map using the new saliency scores, and return to step 406.

Figure 5:
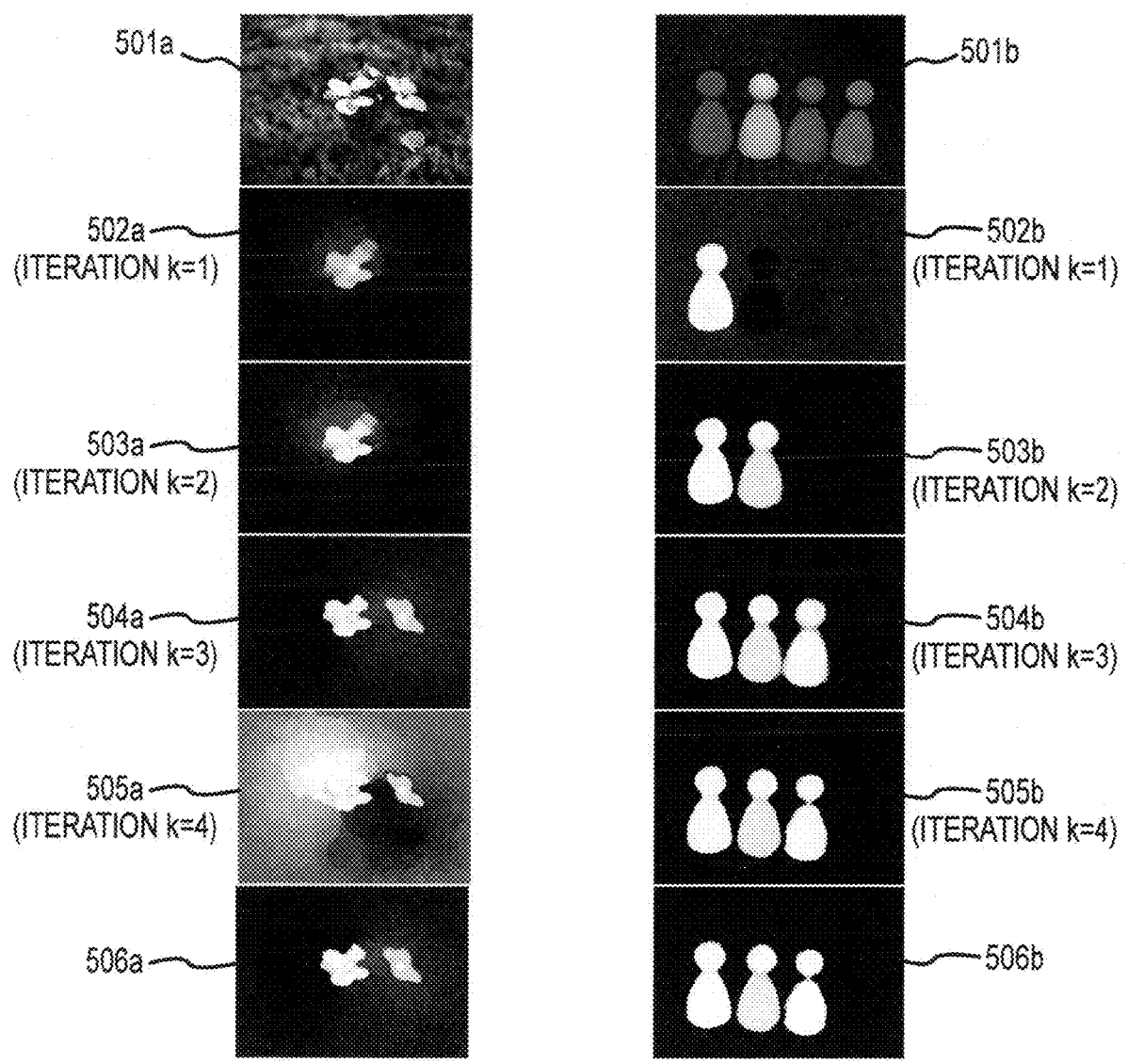
FIG. 5 shows an example of the progression of the method of the present invention, specifically showing an original image with a plurality of separate objects, and a selection of an optimum saliency map associated with a number of iterations of the method of the present invention.

FIG. 5 shows an example embodiment of the progression of the method of the present invention, wherein the best saliency map is chosen having either three or four iterations. For example, in FIG. 5, an original image 501a has corresponding saliency maps 502a, 503a, 504a, and 505a for iterations k=1, k=2, k=3, and k=4. Notice that saliency map 506a is chosen as the best saliency map, which happens to correspond to the saliency map after three iterations (i.e., k=3). FIG. 5 also shows an original image 501b having corresponding saliency maps 502b, 503b, 504b, and 505b for iterations k=1, k=2, k=3, and k=4. Again, saliency map 506b is chosen as the best saliency map, but in this instance, that corresponds to the saliency map after four iterations (i.e., k=4).

An alternative scheme for foreground segmentation according to an embodiment of the present invention proceeds as follows:

Construct the RAG of the image as described in Perazzi et al. and augmented with the improved background node.
Construct the Laplacian matrix of the Image RAG.
Consider the k smallest eigenvectors corresponding to nonzero eigenvalues and use them as a k-dimensional embedding of the graph nodes.
Calculate the new saliency score by:
1. Calculate the distance between the k-dimensional embedding of the background node and node i.

2. Rescale all the distances to lie in the range between [0, 1], which will give us the relevant saliency scores S.

Compute a metric (such as the one described above) for maps created by considering projections with varying number of eigenvectors (we consider up to four eigenvectors for the embedding of our graph) and choose the map with highest score achieved by the metric (i.e., highest score$_{image}$ if using the above metric).

Figure 6:
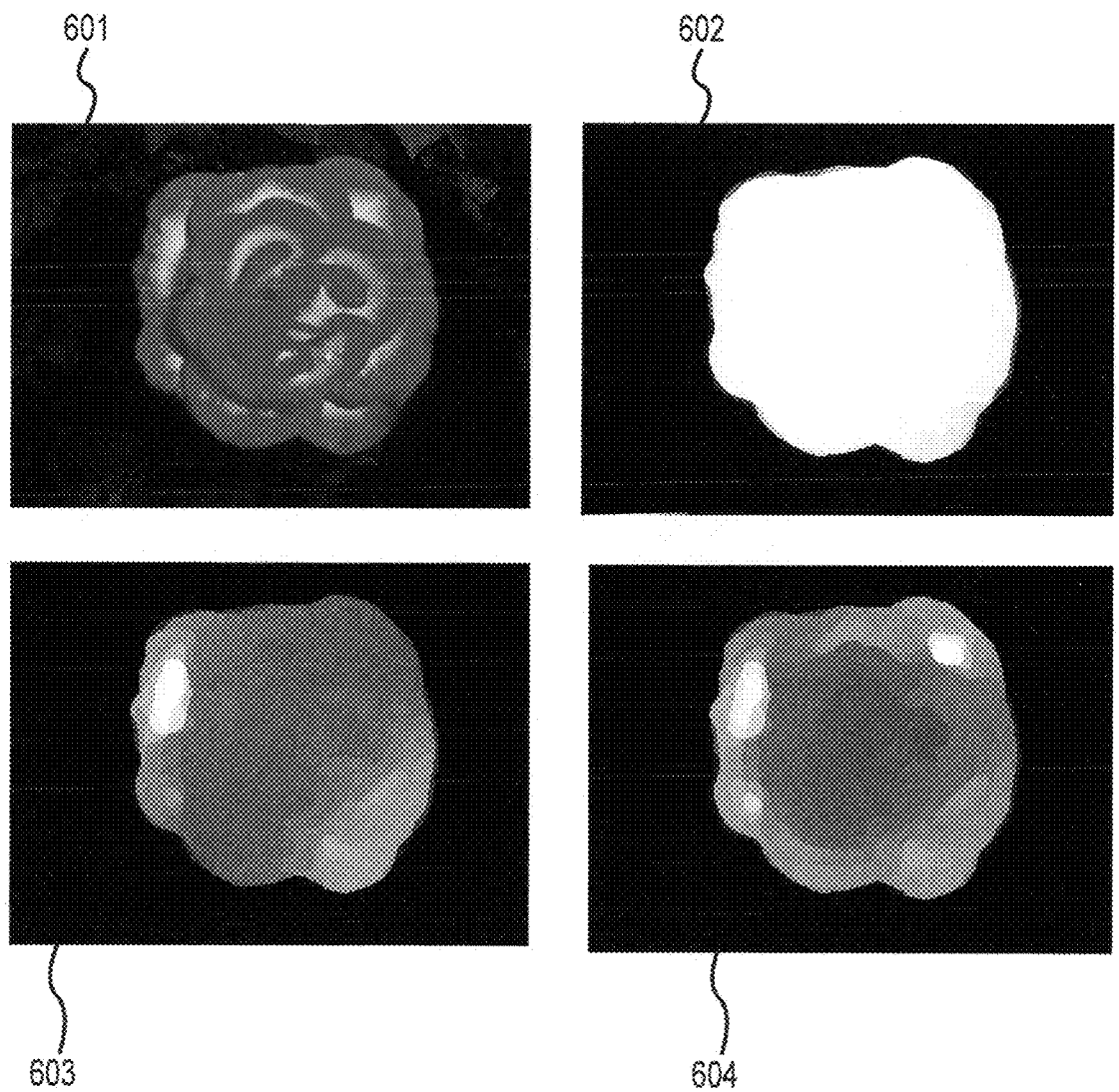
FIG. 6 shows an example of the progression of the method of the present invention, specifically showing an original image with a single object, and a selection of an optimum saliency map associated with a number of iterations of the method of the present invention.
Figure 7:
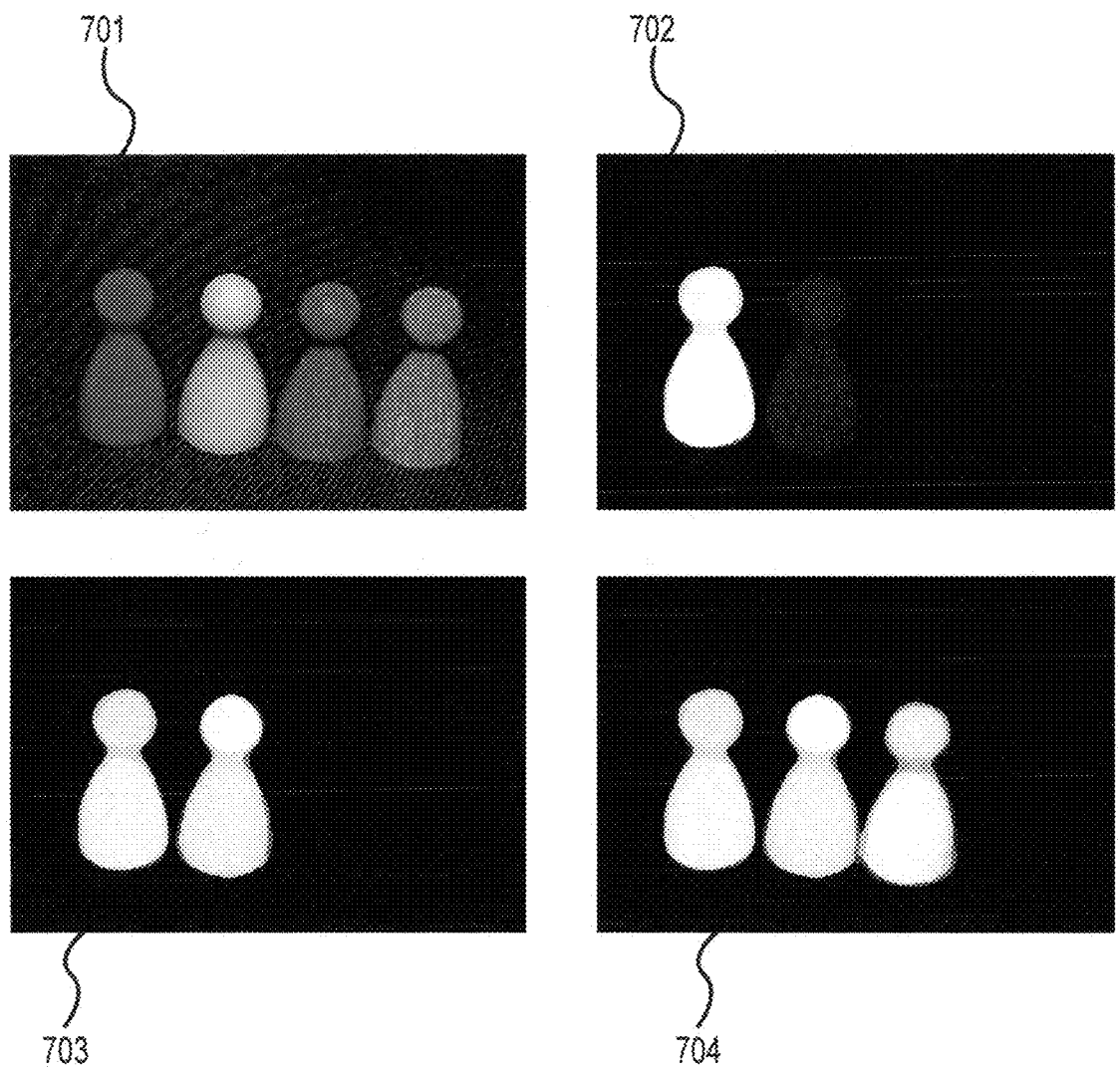
FIG. 7 shows an example of the progression of the method of the present invention, specifically showing an original image with four separate objects, and a selection of an optimum saliency map associated with a number of iterations of the method of the present invention.

Now consider the images and the corresponding sequences of saliency maps depicted in FIG. 6 and FIG. 7. FIG. 6 shows the original image 601 of a scene with one salient object and the corresponding saliency maps as the number of eigenvectors is varied for superpixel embedding: one eigenvector 602, two eigenvectors 603, and three eigenvectors 604. The saliency map 602 with one eigenvector was selected to be the best according to the score. FIG. 7 shows the original image 701 of a scene with multiple salient objects and the corresponding saliency maps as the number of eigenvectors is varied for superpixel embedding: one eigenvector 702, two eigenvectors 703, and three eigenvectors 704. In this case, the saliency map 704 with three eigenvectors was selected to be the best according to the score.

Figure 8:
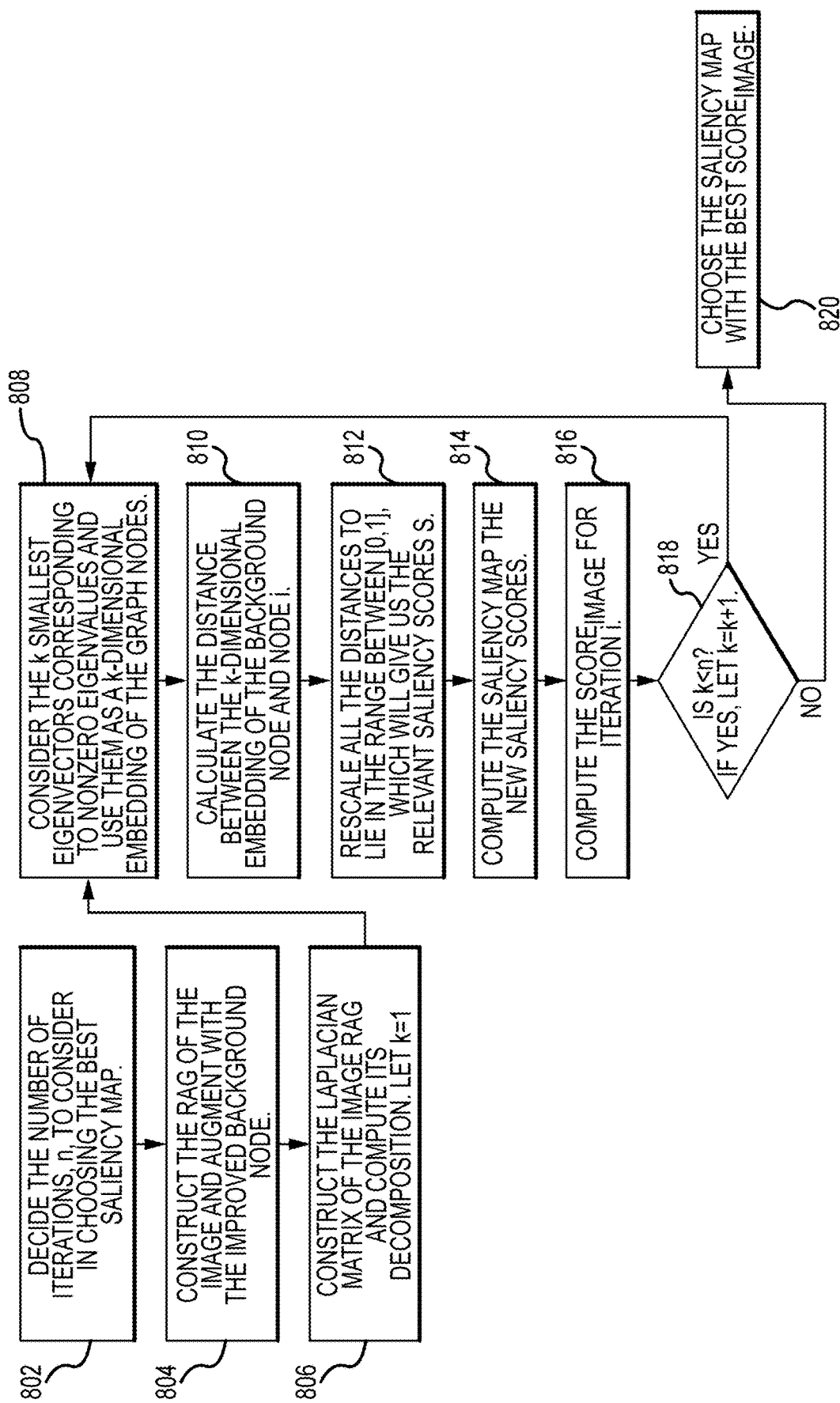
FIG. 8 shows a flowchart corresponding to a second embodiment of the invention.

FIG. 8 shows the flowchart that corresponds to the second method of the present invention. At step 802 the total number of iterations, n, to consider in choosing the best Saliency map is decided. At step 804, the RAG of the image as described in Perazzi et al. is constructed and augmented with the improved background node. At step 806, a Laplacian matrix of the image RAG is constructed and its decomposition is computed, and k is set equal to 1. At step 808, the k smallest eigenvectors corresponding to k smallest nonzero eigenvalues are considered and are used as k-dimensional embedding of the graph nodes. The k-dimensional embedding is a numerical representation of each of the nodes of the image RAG. The embedding includes k numerical descriptors that are obtained from the k eigenvectors in consideration (i.e., the component of each eigenvector that corresponds to a particular node is used, e.g., if the node called i is represented by the m$^{th}$ component of an eigenvector, the k-dimensional embedding of node i includes the m$^{th}$ components of each eigenvector.) At step 810, the distance between the k-dimensional embedding of the background node and node i is calculated. At step 812, all of the distances are rescaled to lie in the range between [0,1], which gives the relevant saliency scores S. At step 814, the saliency map and the new saliency scores are computed. At step 816, the score$_{image}$ for iteration i is computed. At step 818, ask if k<n? If yes, k=k+1, and the method continues at step 808. If no, the method terminates at step 820 and the saliency map with the best score$_{image}$ is chosen.

Figure 9:
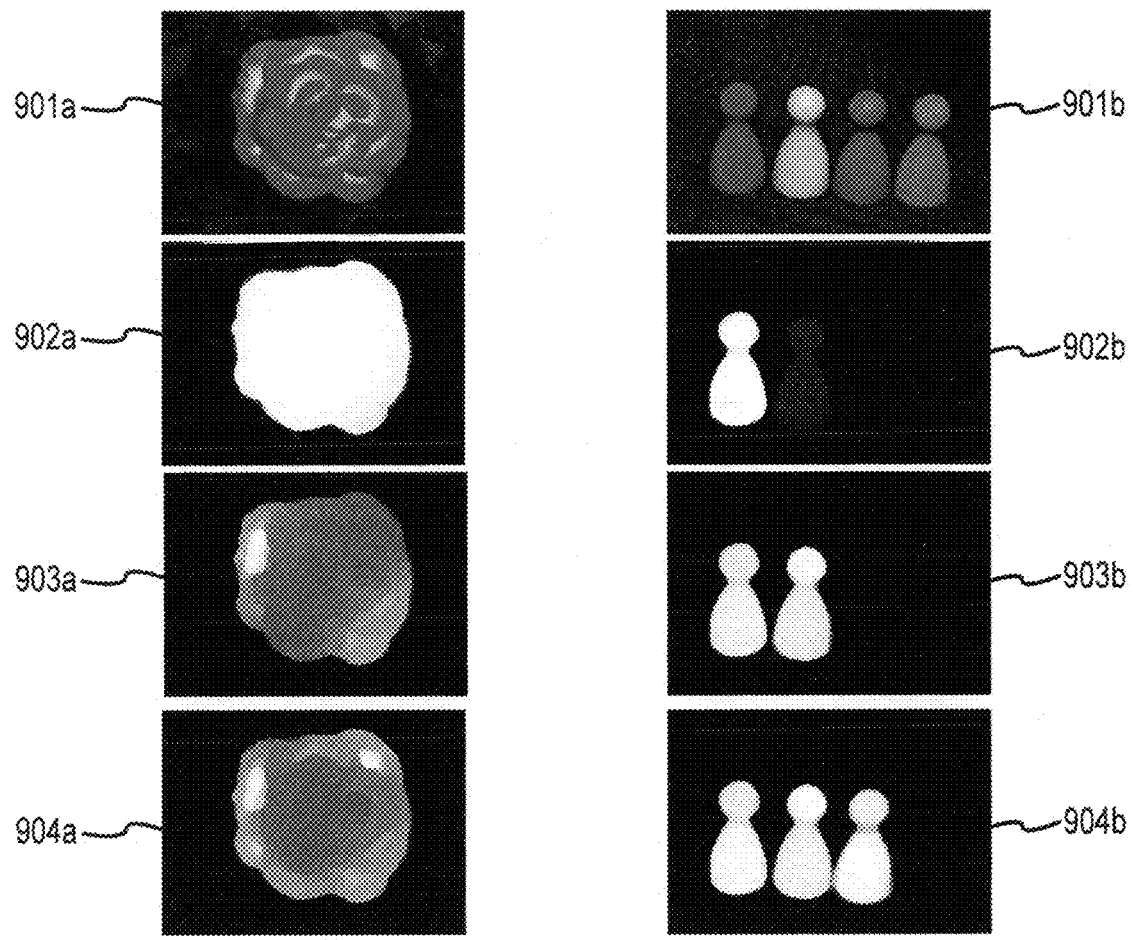
FIG. 9 shows another example of the progression of the method of the present invention, wherein the total number of eigenvectors is three, and the best saliency map for an image with a single object corresponds to one iteration, and the best saliency map for an image with four objects corresponds to three iterations.

FIG. 9 shows an example of the progression of a embodiment of the present invention, when the total number of eigenvectors to consider to be chosen is three. In other words, in a first step, the number of iterations, n, is selected. In the embodiment shown in FIG. 9, n is set equal to three. FIG. 9 shows an original image 901a, which includes a single object. FIG. 9 also shows a second original image 901b, which includes four objects. Images 902a and 902b correspond to an iteration with k=1, and a saliency map with one eigenvector. Images 903a and 903b correspond to an iteration with k=2, and a saliency map with two eigenvectors. Images 904a and 904b correspond to an iteration with k=3, and a saliency map with three eigenvectors. Note that for original image 901a (which contains just one object), the best map is image 902a with one iteration. For original image 901b (which contains four objects), the best map is image 904b with three iterations.

An alternative embodiment of the present invention is directed to a method comprising extracting multiple salient objects. According to this embodiment, the method first computes the desired number of eigenvectors to consider and subsequently constructs the saliency map. As part of this method, an adaptive way is used to calculate a threshold. The adaptive threshold was proposed in "Frequency-tuned Salient Region Detection," by R. Achanta, S. Hemami, F. Estrada and S. Süsstrunk, IEEE International Conference on Computer Vision and Pattern Recognition, pp. 1597-1604 (2009). The adaptive threshold is defined as twice the mean image saliency:

$$T_a = \frac{2}{W*H} \sum_{x=1}^{m} \sum_{y=1}^{n} S(x, y) \tag{9}$$

This embodiment involves a method comprising the following steps:

First, pre-compute the number, n, of eigenvectors to consider.

Compute the vector of Saliency scores, S, for the superpixels using the improved background prior.

If the n=1, then the method is completed. Otherwise repeat the following procedure for n≥2. Assume the saliency scores for the first k, k<n dimensions, which we will call $S_k$, have been computed. To incorporate the k+1$^{th}$ dimension in the computation of the final saliency scores S, proceed as follows:

Compute the saliency scores for the k+1$^{th}$ dimension, $S_{k+1}$, by computing the distance of each superpixel to the background node and rescaling the score between [0;1].

Compute the threshold $T_a^{k+1}$ based on $S_{k+1}$ and extract the set of superpixels i for which it is true that $S_i^{k+1} \geq T_a^{k+1}$ and call the set N.

For i∈N, let $S_i^{k+1} := \max\{S_i^{k+1}, S_i^k\}$, otherwise $S_i^{k+1} := S_i^k$.

If k+1<n, then repeat the procedure, else construct the image saliency map.

Figure 10:
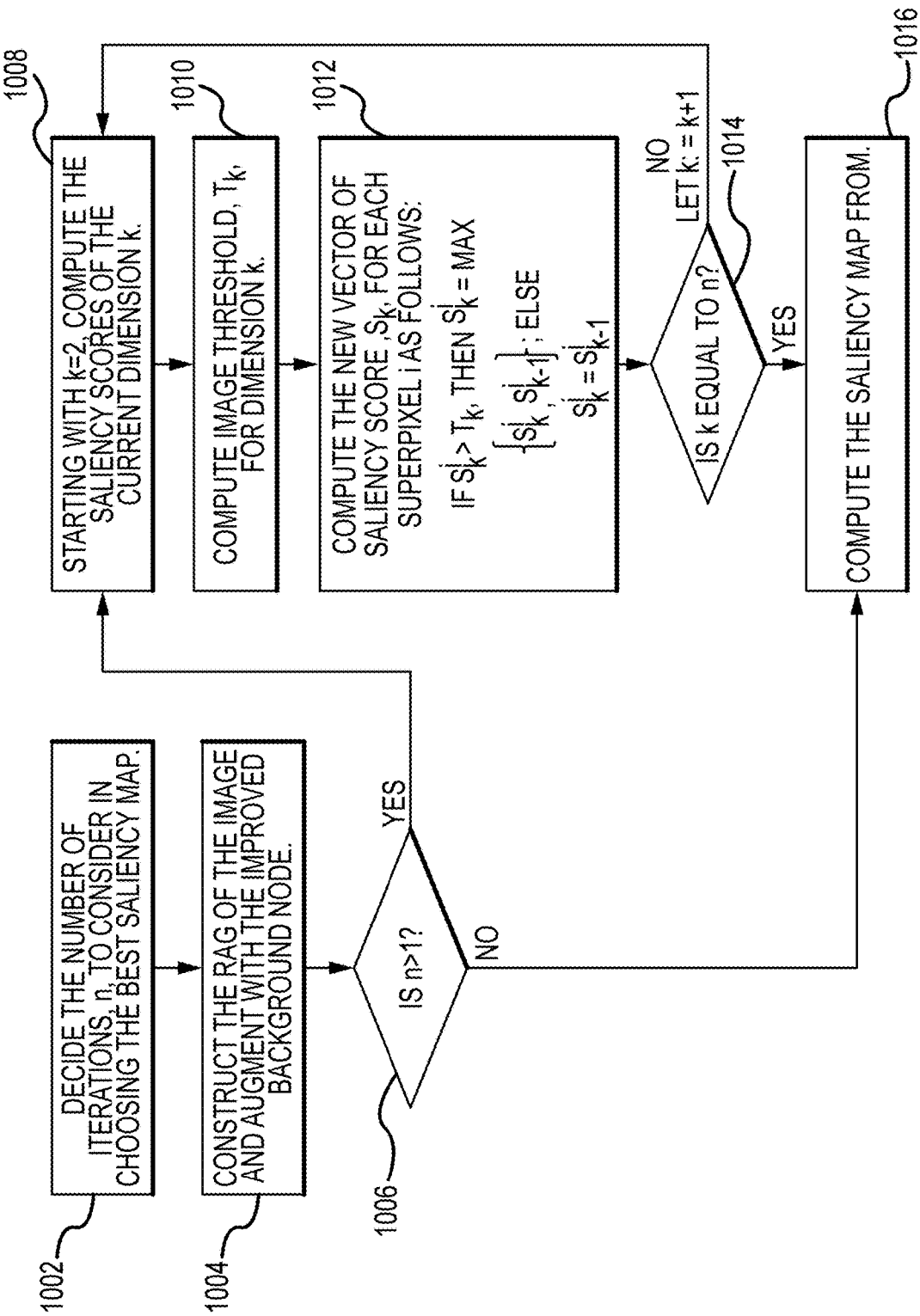
FIG. 10 shows a flowchart corresponding to a third embodiment of the invention.

FIG. 10 shows a flowchart that corresponds to this method. At step 1002, the number of iterations, n, to consider in choosing the best Saliency map is decided. At step 1004, the RAG of the image as described in Perazzi et al. is constructed, and augmented with an improved background node. Step 1006 asks if n>1? If no, then the method is terminated at step 1016 by computing the saliency map from the saliency scores obtained by computing second smallest eigenvector from the Laplacian matrix of the Image Adjacency Graph constructed from the image using the augmented background prior. If yes, the method continues at step 1008. Starting with k=2, the Saliency scores of the current dimension K are computed. At step 1010, the image threshold $T_k$, for dimension k is computed. At step 1012, the new vector of the Saliency score $S_k$ for each superpixel i is computed as set forth above. Step 1014 asks if k is equal to n. If yes, then the method terminates at step 1016. If no, then k is set to k+1, and the method continues at step 1008.

Figure 11:
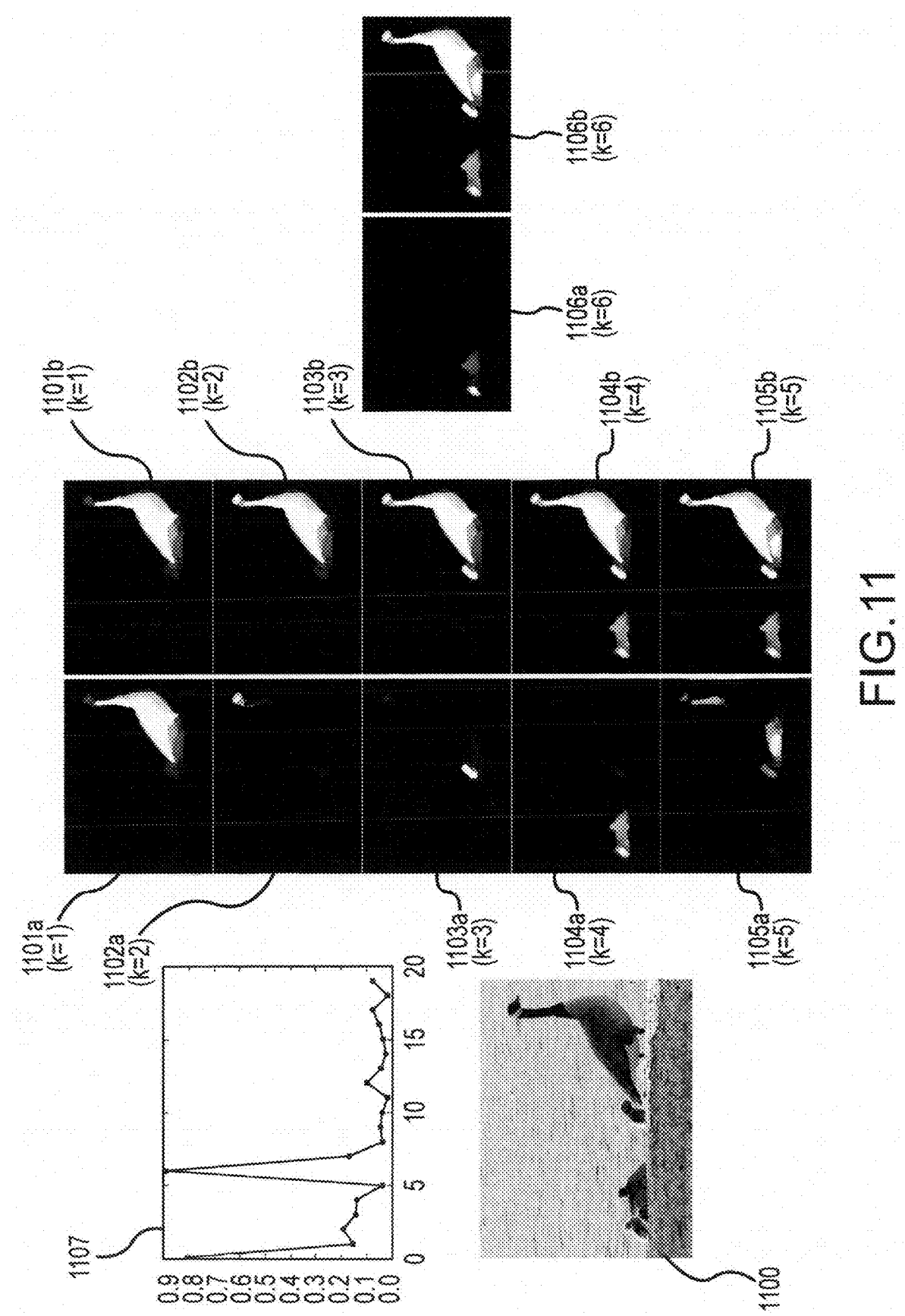
FIG. 11 shows another example of the progression of the method of the present invention for an image with multiple salient subjects and corresponding saliency maps for a total of six iterations of the method of the present invention.

FIG. 11 shows an example of the progression of the method illustrated in FIG. 10 and described above. FIG. 11 includes an original image 1100, which includes multiple salient objects. A dimension saliency map 1101a and a total saliency map 1101b are shown for a first iteration (k=1). A dimension saliency map 1102*a* and a total saliency map 1102*b* are shown for a second iteration (k=2). A dimension saliency map 1103*a* and a total saliency map 1103*b* are shown for a third iteration (k=3). A dimension saliency map 1104*a* and a total saliency map 1104*b* are shown for a fourth iteration (k=4). A dimension saliency map 1105*a* and a total saliency map 1105*b* are shown for a fifth iteration (k=5). Finally, a dimension saliency map 1106*a* and a total saliency map 1106*b* are shown for a sixth iteration (k=6). The best dimension (which is six in this case) is chosen according to equation (8), as is shown in graph 1107.

Figure 12:
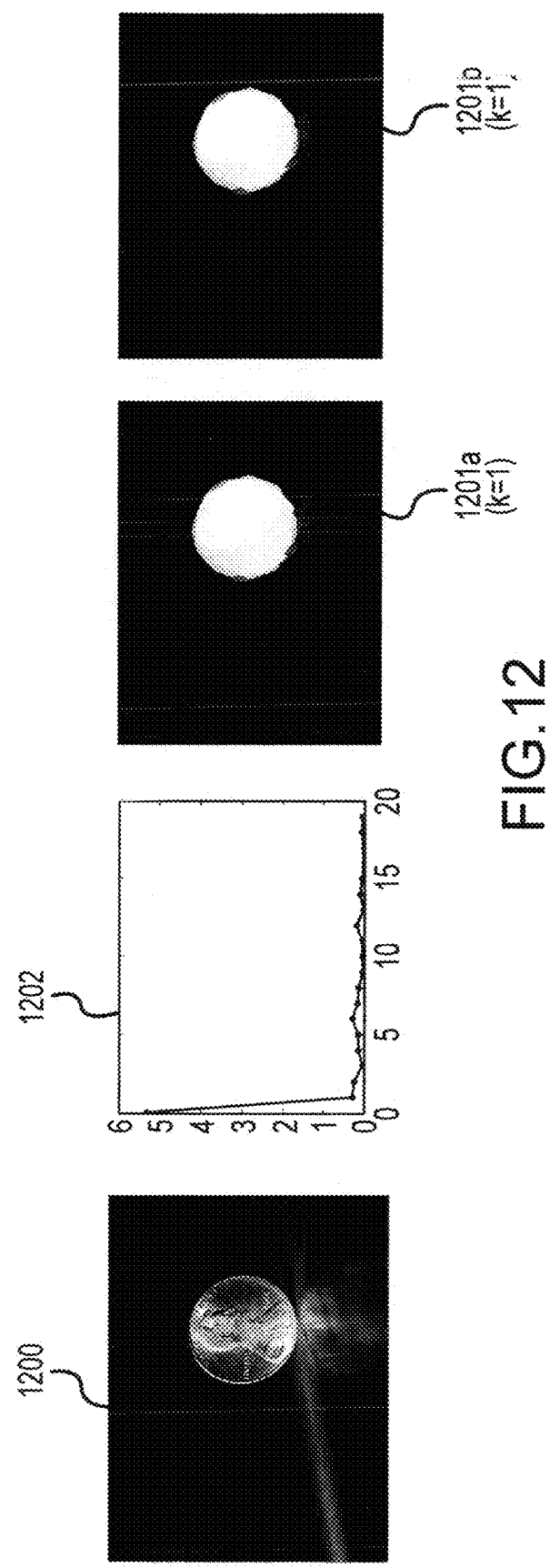
FIG. 12 shows another example of the progression of the method of the present invention for an image with a single salient subject wherein only one iteration is performed.

FIG. 12 shows an example of the progression of the method illustrated in FIG. 10 and described above. FIG. 12 includes an original image 1200, which includes a single salient object. A dimension saliency map 1201*a* and a total saliency map 1201*b* are shown for a first iteration (k=1). The best dimension (which is one in this case) is chosen according to equation (8) as is shown in graph 1202.

Figure 13:
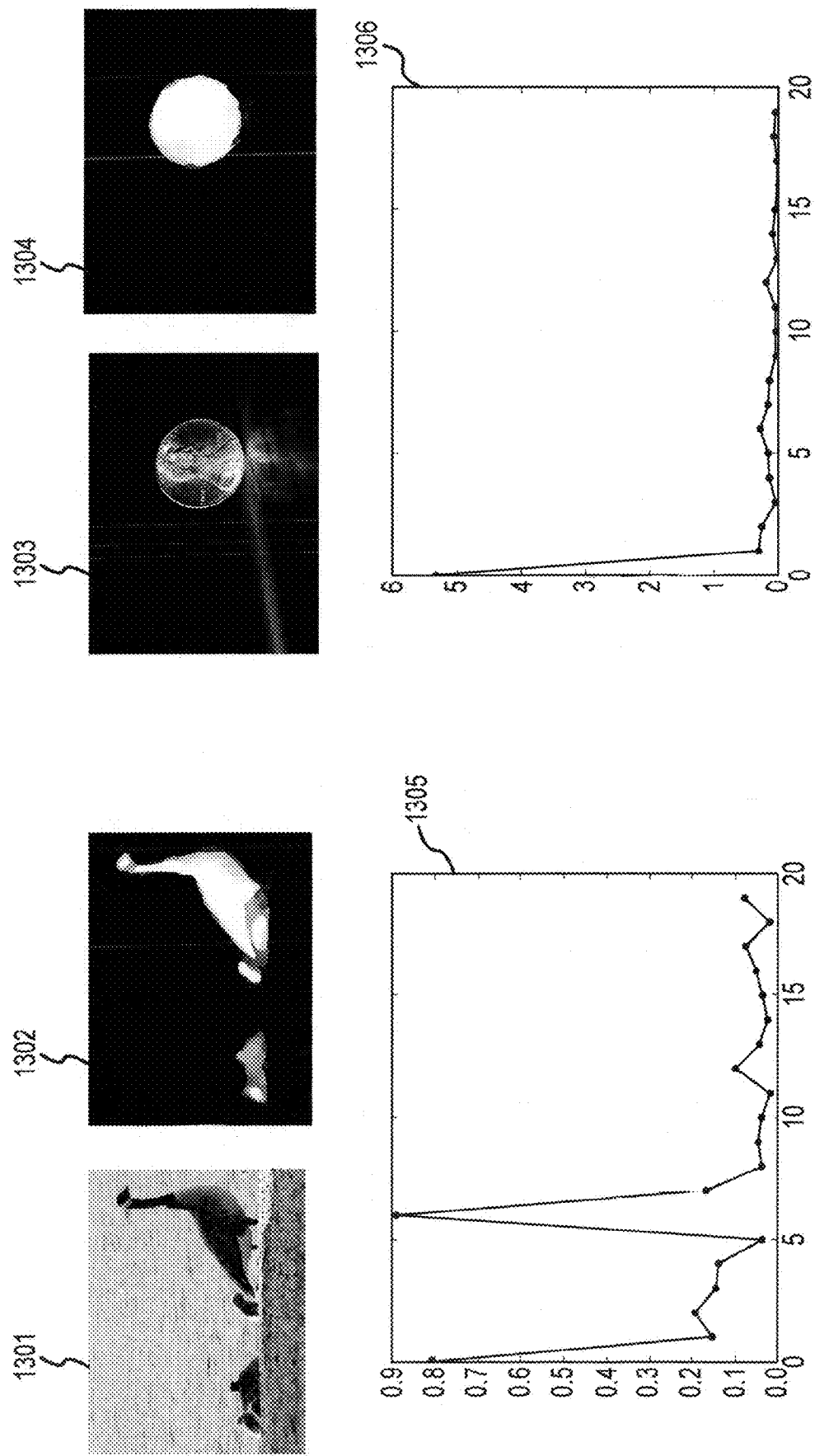
FIG. 13 shows examples of saliency maps obtained according to the third method of the present invention.

FIG. 13 shows an example of the saliency maps as obtained by the method illustrated in FIG. 10 and described above. Specifically, FIG. 13 shows example plots (1305, 1306)—one of the Eigenvalue Function Difference as defined by equation (7) for a multi-subject image (plot 1305), and one of the Eigenvalue Function Difference for a single subject image (plot 1306). Plot 1305 corresponds to the original image 1301, which contains multiple salient objects. The final saliency map for original image 1301 is shown as 1302. Plot 1306 corresponds to the original image 1302, which contains just a single salient object. The final saliency map for original image 1303 is shown as 1304.

The Computational performance of the method of the present invention is described below. From experience, the K-Means clustering of the colors incurs little performance penalty to the overall algorithm due to the fact that the clustering is done on the average-superpixel colors and the number, of superpixels in the border is much smaller than the pixels in the border.

Segmentation results of the present invention are described below. By assigning the background node a set of most frequent colors, in the case where the image has a "complicated" background or multiple colors in the image, the resulting graph will have higher weights on the edges connecting the border to the background node, which often produces good foreground detection results.

When the saliency maps of the original images are analyzed, it can be seen that the method of the present invention tends to pick out a single subject with a distinctive color. Therefore, in order to detect multiple foreground subjects, an embodiment of the present invention iteratively detects the most salient objects in the foreground. As can be seen from the example output depicted in FIG. 14, improved results in detecting multiple salient subjects as compared to the prior art methods are obtained.

Figure 14:
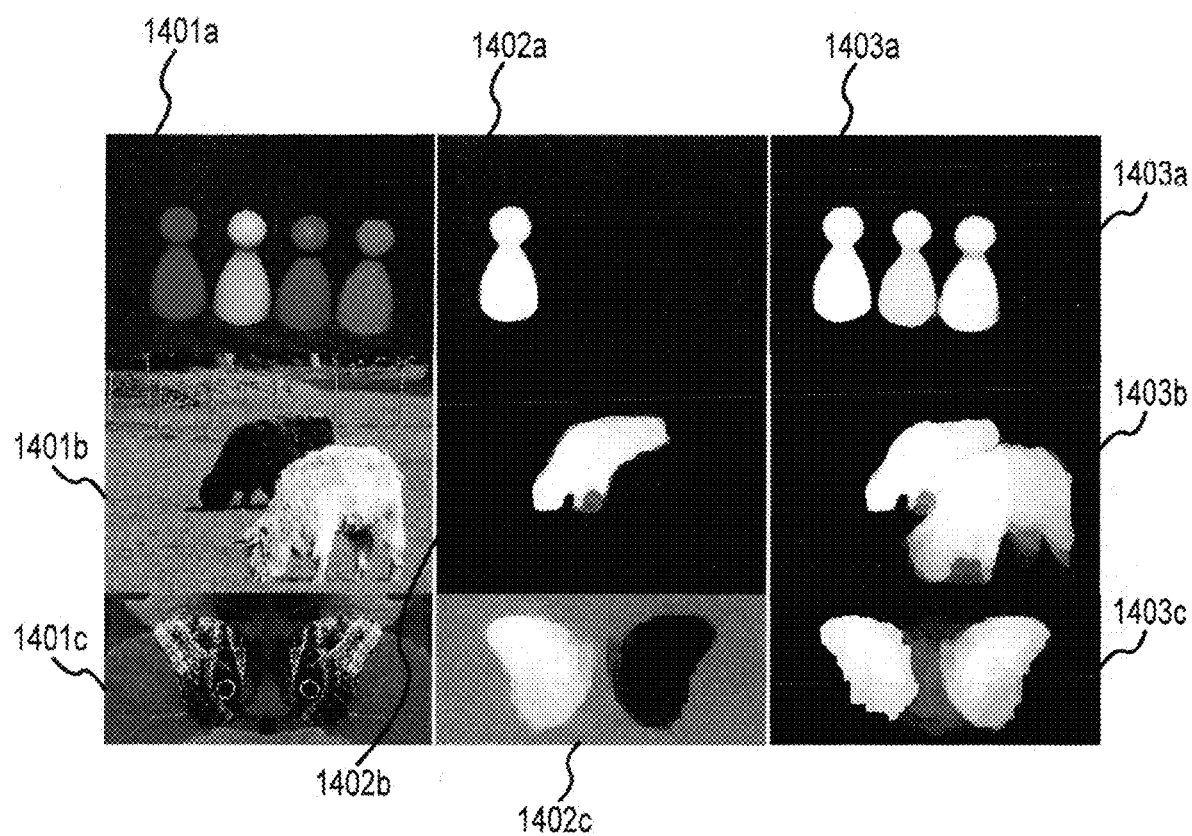
FIG. 14 shows examples of improved performance in saliency maps using a higher dimensional node embedding according to the method of the present invention.

The last three sets of images in FIG. 14 show the results of the foreground segmentation in the case when a higher dimensional node embedding is used (as opposed to the using only the Fiedler vector as in Perazzi et al.). FIG. 14 shows three original images (1401*a*, 1401*b*, and 1401*c*), their corresponding saliency maps as obtained pursuant to the prior art method described by Perazzi et al. (1402*a*, 1402*b*, and 1402*c*), and corresponding saliency maps obtained pursuant to the present invention described herein (1403*a*, 1403*b*, and 1403*c*). In summary, the method of the present invention provides:

1. Modification of the image prior: instead of assigning to the image "background" node the average border background color (average color of the border superpixels), the method first performs a K-Means clustering of the colors. Then the method attaches to the background node a set of colors that represent the cluster centers. To compute the edge weight between the background node and the border regions, the maximum of the weights computed between region i and each of the k cluster center colors is taken:

$$w_{i,b} = \max_{j \in \{1,\ldots,k\}} \frac{1}{\|c_i - c_j^b\|^2 + \varepsilon}.$$

2. An iterative segmentation scheme, which extends the foreground segmentation to allow for the presence of multiple salient subjects in the image.
3. Alternative multi-object foreground segmentation, which uses the eigenvector of the Image RAG as an embedding for the nodes. This embedding is then used to calculate an alternative saliency score.
4. A new stopping criterion and metric for multi-object segmentation is used.

While the foregoing written description describes exemplary embodiments of the present invention, persons of ordinary skill in the art will appreciate that the inventors have contemplated the existence of variations and combinations of these embodiments. The invention is therefore not to be limited strictly by any exemplary embodiments described herein. Alterations, modifications, and deviations from the embodiments may be made and still achieve the advantages of the invention without departing from the spirit or scope of the invention. Such alterations, modifications, and deviations should be understood by persons of ordinary skill in the art to be covered by the appended claims.

The invention claimed is:

1. A method for detecting and segmenting multiple foreground objects, comprising:
    (a) performing, on a digital image, an initial foreground segmentation using superpixel segmentation with an augmented background model to generate an image adjacency graph;
    (b) computing a set of saliency scores from the image adjacency graph;
    (c) finding a set of nodes or superpixels from the image adjacency graph for which the saliency score is greater than a specified threshold;
    (d) modifying the image adjacency graph by cutting out nodes in the set of nodes and storing the saliency scores of these nodes;
    (e) determining new saliency scores for a region that remains in the image adjacency graph by computing the Fiedler Vector of the modified image adjacency graph;
    (f) combining the new saliency scores of the region with the saliency scores for the nodes from the set of nodes to obtain a new saliency image;
    (g) computing a new overall saliency score for the new saliency image;
    repeating steps (c) to (g) a predetermined number of iterations; and
    choosing a segmentation map with highest overall image saliency score.

2. The method of claim 1 wherein the augmented background model comprises a multi-color background model obtained by clustering the superpixel colors represented in a Lab color space.

3. The method of claim 1, wherein the image adjacency graph comprises a reduced image representation of the digital image, in which a group of pixels are represented by an average color of pixels in a corresponding superpixel and represented by a node in a graph, and local relationships in the image are represented by connecting two regions in the graph if the corresponding superpixels share a border in the original image.

4. The method of claim 1 wherein all saliency scores are computed by using the Fiedler vector, and rescaling the resulting scores between [0; 1].

5. The method of claim 1, wherein the new overall saliency score is computed by combining a silhouette score and a mean image saliency.

6. The method of claim 1 wherein cutting out nodes comprises removing the nodes from a graph representation of the digital image that have saliency values exceeding a predetermined threshold.

* * * * *